G. H. GROTH.
VEHICLE WHEEL.
APPLICATION FILED MAY 26, 1908.
903,708.
Patented Nov. 10, 1908.
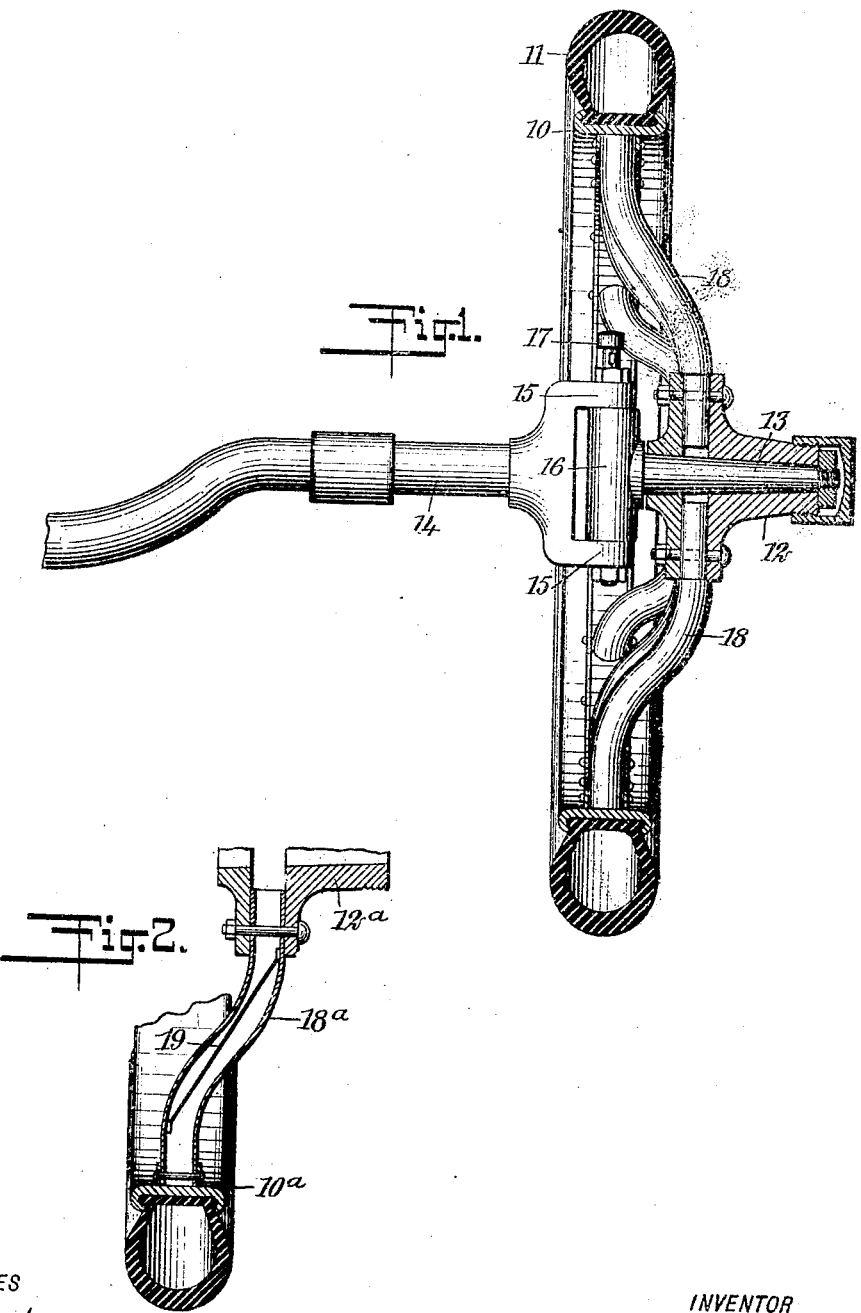
WITNESSES
F. G. Hackenburg.
C. W. Fairbank.
INVENTOR
George H. Groth
BY Munn & Co.
ATTORNEYS

UNITED STATES PATENT OFFICE.

GEORGE H. GROTH, OF CINCINNATI, OHIO, ASSIGNOR OF ONE-HALF TO AUTA N. GROTH, OF CINCINNATI, OHIO.

VEHICLE-WHEEL.

No. 903,708.　　　　Specification of Letters Patent.　　Patented Nov. 10, 1908.

Application filed May 26, 1908. Serial No. 435,948.

*To all whom it may concern:*

Be it known that I, GEORGE H. GROTH, a citizen of the United States, and a resident of Cincinnati, in the county of Hamilton and State of Ohio, have invented a new and Improved Vehicle-Wheel, of which the following is a full, clear, and exact description.

This invention relates to certain improvements in vehicle wheels, and more particularly to the steering wheels of motor vehicles.

The object of the invention is to so construct the wheel that the ordinary steering knuckle may be employed, but at the same time, the pivot of the steering knuckle may be located in the plane of the wheel.

In motor vehicles, it has been found through experience that the steering wheel may be turned or slued far easier when the center of the sluing movement is within the plane of the wheel. In order to accomplish this, various wheels have been constructed which included a hub of extremely large size, and a special form of steering knuckle mounted within the hub.

In my improved wheel, no changes whatever need be made in the axle, steering knuckle, or spindle, and the hub need not vary from any of the common forms now in use.

My invention consists in so forming the spokes that the pivot of the steering knuckle will lie in a plane intermediate the opposite sides of the rim.

Reference is to be had to the accompanying drawings forming a part of this specification, in which similar characters of reference indicate corresponding parts in both figures.

Figure 1 is a vertical section through a wheel constructed in accordance with my invention; and Fig. 2 is a section through a portion of the wheel involving a slight change in the formation of the spoke.

The specific form of my improved wheel illustrated in Fig. 1, includes a rim 10 of any suitable character, and having secured thereto a suitable tire 11, preferably, but not necessarily, pneumatic. The construction of the tire and rim do not involve any feature of my invention.

At the center of the wheel is a hub 12, also of any suitable character, and adapted to be mounted on the spindle 13 of the vehicle axle. The body 14 of the axle is connected to the spindle 13 by a suitable steering knuckle, here illustrated as including upper and lower journals or supports 15 on the body of the axle, and a sleeve 16 on the spindle and rotatable about a vertical pivot bolt 17 extending through the sleeve and supports or journals 15.

The main feature of my invention involves the spokes, and these spokes are so formed that the pivot of the steering knuckle comes within the plane of the wheel. In Fig. 1, these spokes are illustrated as being formed of wood, and each spoke 18 is bent to form a compound curve. The opposite ends of each spoke extend substantially parallel, but that portion of the spoke intermediate the ends, is so bent that the outer ends of the spokes are offset a distance equal to the distance between the pivot of the steering knuckle and the attachment of the inner end of the spoke to the hub. The spokes need not necessarily be formed of wood, as shown in Fig. 1, but may, if desired, be formed of hollow tubing as shown in Fig. 2. The hollow tubing spokes 18$^a$ are secured to the hub 12$^a$ and the rim 10$^a$ in any desired manner; but to resist the thrust on the spokes and to reinforce them, each preferably includes a reinforcing rod, bar, or wire 19 upon the interior thereof, and extending diagonally from one side of the spoke adjacent the hub to the opposite side of the spoke adjacent the rim.

The weight of the vehicle is supported at all times on the portions of the wheel which are lowermost or in engagement with the ground; and by bringing the steering knuckle directly above the point of support, no resistance is offered to the turning of the wheel about the steering knuckle pivot, save the frictional resistance with the ground.

The wheels may be substituted in place of the wheels commonly used on motor vehicles, without involving any change whatsoever in the construction of the axle, steering knuckle, or spindle.

Having thus described my invention, I claim as new and desire to secure by Letters Patent:

1. The combination with a steering axle having a body, a steering knuckle and a spindle, of a vehicle wheel having a hub mounted on said spindle and independent of said steering knuckle, a rim disposed in a plane including the pivot of the steering knuckle, and a plurality of separate spokes connecting said hub and rim and each bent to form a compound curve.

2. The combination with a steering axle having a body, a steering knuckle, and a spindle, of a vehicle wheel having a hub mounted on said spindle and independent of said steering knuckle, a rim disposed in a plane including the pivot of the steering knuckle, and a plurality of separate spokes, each having its inner end connected to said hub intermediate the ends of the latter, and each having its outer end connected to said rim intermediate the side edges of the latter.

3. The combination with a steering axle having a body, a steering knuckle, and a spindle extending outwardly from said steering knuckle, of a vehicle wheel having a hub mounted on said spindle and disposed upon the opposite side of the pivot of the steering knuckle from the body of the steering knuckle, said hub having an annular row of spoke sockets, a rim disposed in a plane including the pivot of the steering knuckle, and a plurality of separate spokes, each having its outer end in engagement with said rim intermediate the side edges of the latter, and having its inner end fitting within a socket in said hub intermediate the ends of the latter.

In testimony whereof I have signed my name to this specification in the presence of two subscribing witnesses.

GEORGE H. GROTH.

Witnesses:
JAMES O'HARA,
GEO. E. WYDMAN.